United States Patent
Bickle et al.

(10) Patent No.: US 6,471,405 B1
(45) Date of Patent: Oct. 29, 2002

(54) ASSEMBLED FLANGE-BEARING SHELL

(75) Inventors: Wolfgang Bickle, Reilingen; Werner Hainke, Geisenheim; Kurt Kaldenhoff, Berlin; Werner Rudolf, Heidelberg; Werner Schubert, Wiesloch, all of (DE)

(73) Assignee: K.S. Gleitlager GmbH (DE)

( * ) Notice: Subject to any disclaimer, the term of this patent is extended or adjusted under 35 U.S.C. 154(b) by 0 days.

(21) Appl. No.: 09/980,076

(22) PCT Filed: Feb. 5, 2000

(86) PCT No.: PCT/EP00/00917
§ 371 (c)(1), (2), (4) Date: Nov. 28, 2001

(87) PCT Pub. No.: WO00/73673
PCT Pub. Date: Dec. 7, 2000

(30) Foreign Application Priority Data

May 31, 1999 (DE) .......................... 199 24 854

(51) Int. Cl.$^7$ ................................ F16C 17/10
(52) U.S. Cl. ........................ 384/294; 384/275
(58) Field of Search ................ 384/294, 288, 384/275, 296, 429, 430

(56) References Cited

U.S. PATENT DOCUMENTS

| | | | | |
|---|---|---|---|---|
| 5,114,246 A | * | 5/1992 | Gowan | 384/275 |
| 5,139,348 A | * | 8/1992 | Bryden et al. | 384/275 |
| 5,145,264 A | * | 9/1992 | Bryden et al. | 384/275 |
| 5,267,797 A | * | 12/1993 | Brandt | 384/294 |

FOREIGN PATENT DOCUMENTS

| | | |
|---|---|---|
| DE | 26 56 306 | 6/1978 |
| DE | 39 33 667 | 1/1991 |
| DE | 40 15 256 | 11/1991 |
| DE | 40 41 557 | 6/1992 |
| DE | 42 04 988 | 6/1993 |
| DE | 42 25 000 | 11/1993 |
| DE | 43 03 855 | 6/1994 |
| GB | 2 134 189 | 8/1984 |

* cited by examiner

Primary Examiner—Thomas R. Hannon
(74) Attorney, Agent, or Firm—Young & Basile, PC

(57) ABSTRACT

An assembled flange-bearing shell including a half-shell shaped radial bearing part and an axial bearing part which can be fixed on one side in the area of the axial front face of the radial bearing part, or partial ring-wheel shaped axial bearing parts which can be fixed on both sides. Each axial bearing part has inward projecting retaining tongues located around its radius. The retaining tongues can be engaged in retaining recesses in the area of an axial rim section of the radial bearing part. The flange-bearing shell has two retaining tongues on both sides of the vertex which form an undercut. The undercut is engaged from below by a clip of the radial bearing part which lies axially adjacent to each respective open-edged retaining recess. The clip is curved inward in an axial direction from its extension along the periphery into the retaining recess in order to secure the axial bearing part against detachment.

19 Claims, 2 Drawing Sheets

ASSEMBLED FLANGE-BEARING SHELL

BACKGROUND

The invention relates to an assembled flange-bearing shell having a half-shell shaped radial bearing part and an axial bearing part which can be attached on one side in the area of the axial front face of the radial bearing part, or having partial flat annular axial bearing parts which can be attached on both sides, where each axial bearing part has retaining tongues projecting inward around its radius, which can be engaged in retaining recesses in the area of one axial rim section of the radial bearing part, where at least one of the retaining recesses is configured to be open at the edge in the axial direction.

A number of generic flange-bearing shells exist in which, to prevent the axial bearing part on the radial bearing part from becoming detached, one or more of the retaining tongues projecting inward, or spreading fingers assigned to these retaining tongues, which also project inward and are provided as part of the retaining tongues or in addition to them, are bent. These are shown in DE 42 04 988 C1 or DE 43 03 855 C1. In accordance with EP 0 515 657 A1, following a combined radial mating and axial twisting process to assemble the axial bearing part to the radial bearing part, the retaining tongue provided in the vertex is bent by means of notching so that it engages the assigned retaining opening on both sides of the vertex in the radial direction from above on the inside.

Manufacturing the previously described attachment of the axial bearing part at the radial bearing part is complicated, and the dimensional accuracy of the parts suffers when the retaining tongues are bent. Manufacturability is complicated as a consequence of obtaining access, which is necessarily from inside in a radial direction, during the bending of the retaining tongues or of the spreader fingers.

An additional generic flange-bearing shell is known from DE 40 15 256 A1. In an embodiment described in this publication, notches are introduced into the axial front face of the radial bearing part on both sides of the retaining recesses after inserting the retaining tongues into the retaining recesses of the radial bearing part. As a result of this axial exertion of force on the radial bearing part, a combined displacement and bending along the periphery is achieved such that the particular retaining tongue is more or less flanged and can no longer be detached in the axial direction from the retaining recess. The combined displacement and bending requires complex machine tool construction to exert and take up the required forces. Since the material is deformed in immediate proximity to the retaining tab, clearance is not required to seat the axial bearing part on the radial bearing part.

A non-generic flange-bearing shell is known from DE 42 25 000 C1, in which the retaining recesses are closed on all sides. The axial bearing part is brought into the assembly position in the radial plane of the radial bearing part and, once more, a spreader finger section of the particular outer retaining tongue is bent in the peripheral direction.

The object of the present invention is to improve an assembled flange-bearing shell of the type described at the beginning, having axial bearing part and radial bearing part securely attached to prevent separation but still requiring clearance, in such a way that it can be manufactured more simply than known generic flange-bearing shells, without detracting from dimensional accuracy during bending procedures.

SUMMARY

This object is achieved under the invention with a flange-bearing shell of the above-described type by having two retaining tongues on both sides of the vertex form an undercut of the radial direction passing through the vertex or mating direction on the side facing the vertex. When the flange-bearing shell is assembled, it is engaged from below by a tab on the radial bearing part axially adjacent to the specific open-edged retaining recess, which is bent from its extension in the axial direction into the retaining recess so that the axial bearing part is secured against falling out radially by this engagement from below, without itself having been deformed during assembly.

To form a retainer for the axial bearing part which is loss-proof in the radial direction, it has proved to be expedient and also completely adequate if a tab of relatively small dimensions on the radial bearing part is bent very slightly in the axial direction into the recess, to prevent the axial bearing part from falling out of the assembly position. During the assembly of the flange-bearing shell under the invention, in the case of the two retaining recesses, the aforementioned tab can simultaneously be deformed a very small amount into the retaining recess without any difficulties arising with respect to accessibility. Accessibility is far less problematic from the axial front face than bending spreader fingers along the periphery, that is, from the radial inner side of the radial bearing part.

In order to retain the axial bearing part in the axial direction and not have it become detached, an additional retaining tongue could be provided in the vertex, which, in conjunction with a retaining opening, prevents axial loosening of the axial bearing part. On the other hand, it proves to be especially advantageous if an axial undercut of the radial bearing part is axially adjacent to the open-edged retaining recesses on both sides of the vertex, on the side away from the vertex along the periphery, such that the axial bearing part is brought into its assembly position by means of twist-free mating in the radial plane with respect to the radial bearing part, and the retaining tongues are secured against axial loosening by the axial undercut of the retaining recesses. In this case, the additional retaining tongue provided in the vertex and a corresponding recess in the radial bearing part can be dispensed with.

It must be pointed out that the undercut which is formed by the two retaining tongues on both sides of the vertex on the side facing the vertex have to form an undercut of the mating direction of the axial bearing part, which generally corresponds to the radial direction passing through the vertex.

In a particularly advantageous further development of the inventive concept, the end of one retaining recess facing away from the vertex along the periphery forms a bearing surface for the respective retaining tongue, and this bearing surface transfers into the radial bearing part the force transmitted to the axial bearing part resulting from the rotation of a bearing-mounted machine part against the axial bearing part in the peripheral direction. The two retaining recesses provided on both sides of the vertex are advantageously configured in this way. It must be pointed out that the preferably small clearance of the axial bearing part to the radial bearing part in the peripheral direction is advantageously dimensioned so that, depending on the direction of rotation or orientation of the flange-bearing shell, the one or the other retaining tongue can be positioned against the appropriate bearing surface of the retaining recess away from the vertex.

It proves to be quite especially advantageous if the lateral face of the particular retaining tongue working in combination with the bearing surface of the retaining recess runs in the mating direction of the axial bearing part. It is an advantage if the aforementioned lateral face of the retaining tongue and the bearing surface run parallel to each other to make an even input of force possible. But this is not absolutely necessary.

In accordance with a preferred embodiment of the invention, the flange-bearing shell is configured in such a way that the particular retaining tongue engages the radial inner side of the axial rim section of the radial bearing part from above. The retaining recesses are formed towards the inside of the section, and between the undercut and the radial inner side of the axial rim sections there is at least an extremely small radial clearance. In this way, the particular tab axially adjacent to the retaining recess can engage the undercut from below, not only in the mating direction of the joint or the radial direction through the vertex, but also in the radial direction with respect to the observed retaining tongue.

It proves to be especially advantageous from a manufacturing point of perspective if oil grooves are provided on the axial bearing part, aligned with the retaining tongues and extended in the mating direction of the axial bearing part. In this case, the removal of material to create the retaining recesses and the oil grooves can be performed in one operation.

Additional details, advantages and features of the invention can be found in the attached patent claims for whose features protection is being claimed, taken individually or in combination with additional features, and from the illustrations and subsequent description of a preferred embodiment of the invention.

DETAILED DESCRIPTION

Figure 1:
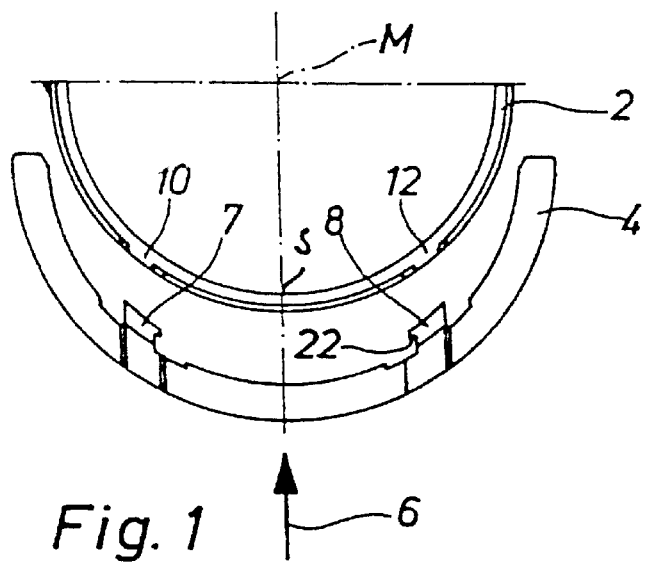
FIG. 1 is a side view of the flange-bearing shell of the invention, with radial bearing part and axial bearing part in a still unmated state.
Figure 2:
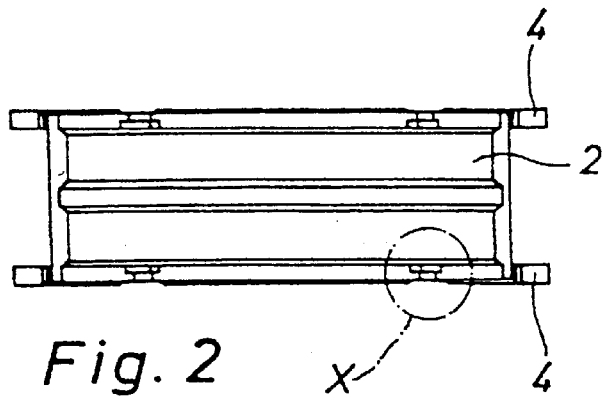
FIG. 2 is a plan view of the flange-bearing shell according to FIG. 1 in the mated state.
Figure 3:
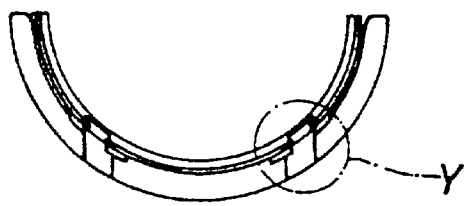
FIG. 3 is a view of the flange-bearing shell according to FIG. 1 in the assembled state, viewed in the axial direction.

FIGS. 1 to 3 show different views of an assembled flange-bearing shell which is formed from a radial bearing part 2 bent into a semicircle and axial bearing parts 4 which are joined to be secure against separation, but nevertheless require clearance. FIG. 1 shows the radial bearing part 2 and an axial bearing part 4 in their still unmated state, where the arrow indicates the direction of mating 6. For the following description, the vertex S of the flange-bearing shell as well as the geometric center point M of the radial bearing part 2 which is bent into a semicircle, are shown. The direction of mating 6 of the axial bearing part can therefore be described as passing radially through the vertex S of the flange-bearing shell. The axial direction runs vertically to the plane of the drawing of FIG. 1.

Figure 5:
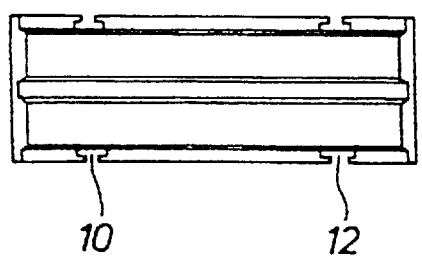
FIG. 5 is a plan view of the radial bearing part of the flange-bearing shell.

The axial bearing part 4 has two retaining tongues 7, 8, which are spaced at intervals from the vertex S along the periphery of the axial bearing part 4. The retaining tongues 7, 8 are aligned in the direction of mating 6 and in the assembled state engage corresponding retaining recesses 10, 12 which can be seen in the individual drawing of the radial bearing part 2 in FIG. 5, and also in the drawing in FIG. 6. After the retaining tongues 7, 8 are inserted into the retaining recesses 10, 12, the axial bearing part 4 is secured against falling out in the radial direction in a way which will be described in more detail and is nevertheless still seated requiring clearance.

Figure 4:
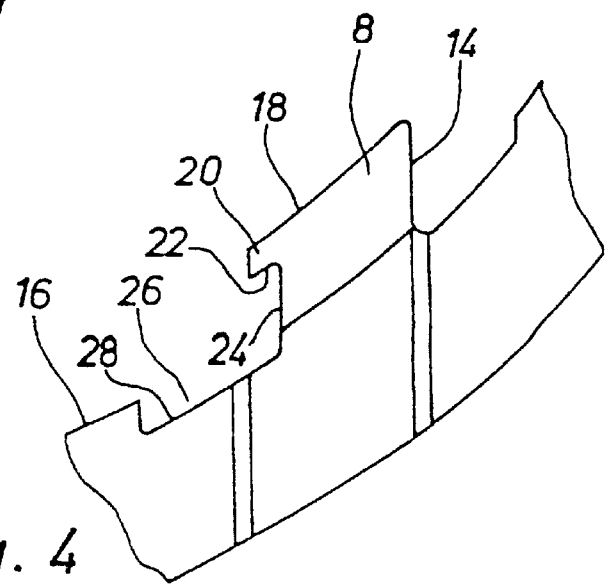
FIG. 4 is an enlarged view of the axial bearing part in the area of a retaining tongue.

Each of the retaining tongues 7, 8 is configured as follows (see FIG. 4): on the side away from the vertex S each tongue 7, 8 has a lateral face 14 which extends parallel to the mating direction 6. The lateral face 14 curves around into a leading edge 18 in the mating direction, running concentric to the circular path of an inner rim 16 of the axial bearing part. The forward edge 18 runs back towards the vertex S and terminates in a lip 20 extending in the direction of the vertex S, which lip forms an undercut 22 of the mating direction 6, or of the radial direction passing through the vertex S. The lip 20 extends about 1.0 mm along the periphery. The undercut 22 in turn curves around into a lateral face 24 facing the vertex S, which in turn runs in the mating direction 6, that is, parallel to the radial direction through the vertex S. The lateral face 24 extends beyond the inner rim 16 as far as a depression 26 with a radial depth of about 1.0 mm on the inside of the axial bearing part 4 and there it bends around into a base 28 of this depression 26. The base 28 in turn curves around and goes up again into the inner rim 16 of the axial bearing part. The retaining tongues can have a peripheral length projected onto the developed plane of 4 to 15 mm.

Figure 6:
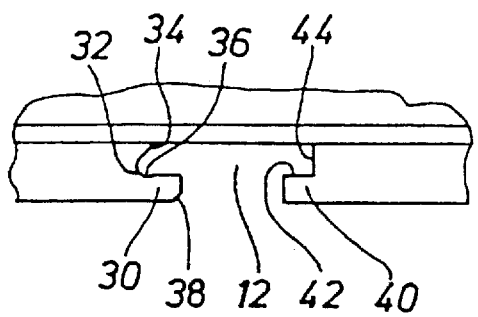
FIG. 6 is an enlarged view of the radial bearing part according to FIG. 5 in the area of a retaining recess viewed in the radial direction.
Figure 8:
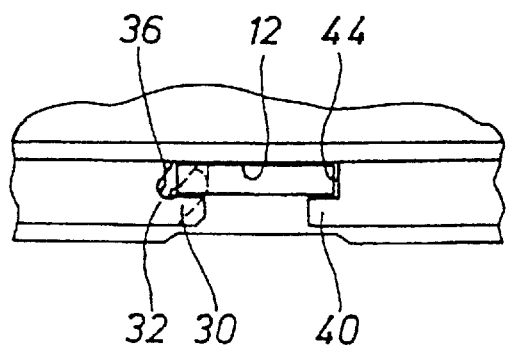
FIG. 8 is an enlarged view of the area "X" in FIG. 2.

The retaining recesses 10, 12 on the axial bearing part 2 which act in conjunction with the retaining tongues 7, 8 are configured as follows:

As can be seen from FIGS. 6 and 8, the retaining recess 12 is configured basically as a rectangle. In the axial direction, the retaining recess 12 terminates in an open-end radiused tab 30 running along the periphery. The tab 30 can be bent into the retaining recess 12 in the axial direction as designed. To promote deformability and to define a predetermined bending point 32, a notch 36 is provided where the tab 30 makes a transition to the surface 34. This surface 34 is adjacent to the retaining recess 12 in the peripheral direction towards the vertex S. The notch 36 is therefore located on the inside towards the recess 12. This notch 36 has a geometrical radius of 0.4 mm and can describe a segment radius between 0.3 and 0.5 mm.

The tab 30 is chamfered towards the axial edge in the area of its open end. There, the tab 30 has a 45° chamfer to the axial direction. The tab of the radial bearing part axially adjacent to the open-edged retaining recess can extend in the peripheral direction 0.8 to 1.5 mm, or 0.9 to 1.2 mm, and can have an axial thickness of 0.7 to 1.2 mm.

On the side opposite to the tab 30 around the periphery, a corresponding tab 40, which forms an undercut 42 effective in the axial direction, is axially adjacent to the retaining recess 12. The tabs 30 and 42 axially adjacent to the open-edged retaining recess and the axial undercut can be spaced 1.8 to 2.8 mm or 2.2 to 2.5 mm apart in the peripheral direction. This undercut 42 secures the assembled axial bearing part 4 in the axial direction. The undercut 42 of the retaining recess 12 changes into a bearing surface 44, which more or less forms the short sides of the rectangular shape defining the outside of the retaining recess 12 away from the vertex S. This bearing surface 44 forms a support for the lateral face 14 of the retaining tongue 8 away from the vertex S. If, after the bearing is assembled, forces act in the peripheral direction and try to twist the axial bearing part 4 with respect to the radial bearing part 2, the lateral face 14 of the retaining tongue 8 is brought into contact with the bearing surface 44 of the retaining recess 12, and these forces are thereby transferred to the radial bearing part 2 and from there to a thrust bearing. The other retaining recess 10 is configured in the identical fashion and has an identical bearing surface facing away from the vertex S, which absorbs peripheral forces if the axial bearing part 4 is twisted clockwise when viewing FIG. 1.

In order to assembly the axial bearing part 4 to the radial bearing part 2, the latter is moved in the mating direction 6 in the radial plane of the radial bearing part 2, where the retaining tongues 7, 8 on the axial bearing part 4 are inserted through the retaining recesses 10, 12 of the radial bearing part 2. When the radial inner edge of the axial bearing part 4 lies against the radial bearing part, the assembly position has been reached. In this position the undercut 22 of the respective retaining tongue 7, 8 is positioned radially within the rim section of the radial bearing part 2 forming the respective retaining recess 10, 12. In order to secure this assembly position and to prevent the axial bearing part 4 from falling out, the tab 30 axially adjacent to the respective retaining recess is bent into the retaining recess 10, 12 and engages the undercut 22 in the mating direction 6 from below. The axial bearing part 2 is thereby prevented from falling out in the radial plane. Axial retention is achieved by the other tab 40, which is axially adjacent to the open-edged retaining recesses 10, 12 on the other side, supporting the respective retaining tongue 7, 8 in the axial direction with its axially effective undercut 42 and preventing it from falling out. Nevertheless, it requires clearance in order to seat the axial bearing part 4 with its retaining tongues 7, 8 in the respective recess 10, 12. FIG. 8 shows the tab 30 both in its original state for the insertion of the retaining tongues as well as in its state after being bent inwards. Because the notch 36 defines a predetermined bending location 32, there is no problem involved in bending the tab 30 inwards, and this can be carried out with great precision.

It proves to be particularly advantageous that, when forces are generated which attempt to twist the axial bearing part 4 in the peripheral direction, the lateral face 14 away from the vertex of the respective retaining tongue 6, 8 is brought against the thrust bearing-like surface 44 of the radial bearing part 2 adjacent to the recess in the peripheral direction. In this way these peripheral forces can be transferred by the axial part of the bearing 4 to the radial part of the bearing 2 and then to the thrust bearing. This works for peripheral forces in both directions. So when installing the completed assembled flange-bearing shell, no special attention needs to be paid to the "direction of rotation," which makes assembly operations considerably easier.

Figure 7:
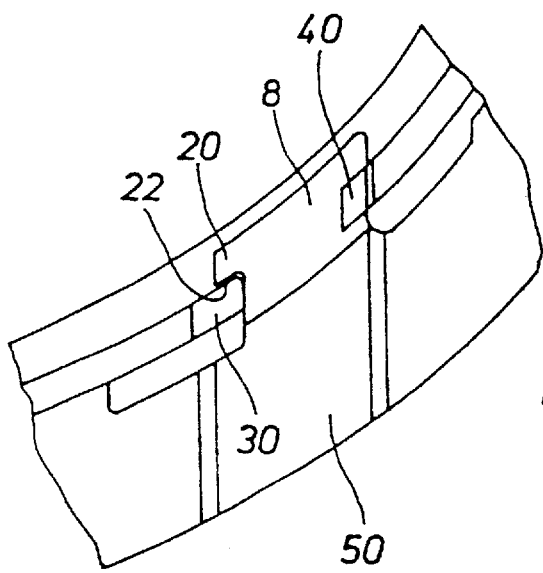
FIG. 7 is an enlarged view of the area "Y" in FIG. 3.

It proves furthermore to be particularly advantageous that the respective retaining tongue 7, 8 is aligned in the mating direction 6 and can therefore be brought into the assembly position in the radial plane without axial twisting. Manufacture can be further simplified by having an oil groove 50 (FIG. 7) formed more or less in alignment with the respective retaining tongue 7, 8. The oil groove 50 is produced by metal removal, preferably by machining. Since material removal is required also in the area of the respective retaining tongue 7, 8, the formation of the retaining tongue 7, 8 and of the oil groove 50 can be performed in one operation.

What is claimed is:

1. An assembled flange-bearing shell having a half-shell shaped radial bearing part and at least one axial bearing part which is attached on one side of the radial bearing part in an area of an axial front face of the radial bearing part, where the axial bearing part has retaining tongues projecting inwards around a radius of the axial bearing part which are engaged with retaining recesses in an area of an axial rim section of the radial bearing part, where at least one of the retaining recesses is configured with an open edge in the axial direction, characterized in that each of the retaining tongues, on both sides of a vertex on a side facing the vertex form an undercut on a lateral radial side running parallel to a mating direction which goes through the vertex; when the flange-bearing shell is completely assembled, the undercut is engaged from below by a tab of the specific open-edged retaining recess axially adjacent to the radial bearing part; the tab being bent from its extension in the peripheral direction in the axial direction into the retaining recess, so that the axial bearing part is secured against falling out in the radial direction.

2. The flange-bearing shell in accordance with claim 1, wherein the open-edged retaining recesses are adjacent on both sides of the vertex on the side away from the vertex in the peripheral direction to an undercut, wherein the axial bearing part is brought into its assembly position by twist-free mating in the radial plane with respect to the radial bearing part, and the retaining tongues are secured by an axial undercut against axial loosening from the retaining recesses.

3. The flange-bearing shell in accordance with claim 2, wherein the tabs axially adjacent to the open-edged retaining recess and the axial undercut are spaced 1.8 to 2.8 mm apart in the peripheral direction.

4. The flange bearing shell in accordance with claim 3 wherein the tabs are spaced 2.2 to 2.5 mm from each other in the peripheral direction.

5. The flange-bearing shell in accordance with claim 1, wherein an end of a retaining recess facing away from the vertex in the peripheral direction forms a bearing surface for the respective retaining tongue, and wherein by means of the bearing surface the force exerted on the axial bearing part as the result of the rotation of a bearing-mounted machine element against the axial bearing part can be transferred in the peripheral direction into the radial bearing part.

6. The flange-bearing shell in accordance with claim 5, wherein the ends of the two retaining recesses provided on both sides of the vertex, which are turned away from the vertex in the peripheral direction, each forms a bearing surface for the respective retaining tongue, and wherein these bearing surfaces transfer the force introduced against the axial bearing part as the result of the rotation of a bearing-mounted machine element against the axial bearing part into the radial bearing part.

7. The flange-bearing shell in accordance with claim 5, wherein the lateral face of the respective retaining tongue working in conjunction with the bearing surface of the retaining recess runs in the mating direction of the axial bearing part.

8. The flange-bearing shell in accordance with claim 5, wherein the lateral face of the respective retaining tongue working in conjunction with the bearing surface of the retaining recess runs parallel to the bearing surface.

9. The flange-bearing shell in accordance with claim 1, wherein the respective retaining tongue radially engages from above the axial rim section of the radial bearing part on the inside, the retaining recesses are formed in the axial rim section, and a small radial clearance exists between the undercut and the radial inner side of the axial rim section.

10. The flange-bearing shell in accordance with claim 1, wherein the radial undercut of the retaining tongues is formed by a 0.8 to 1.2 mm-long lip of the retaining tongue extended in the peripheral direction towards the vertex.

11. The flange-bearing shell in accordance with claim 1, wherein the retaining tongues are configured concentric to the peripheral direction on the leading edge in the mating direction.

12. The flange-bearing shell in accordance with claim 1, wherein oil grooves are provided on the axial bearing part aligned with the retaining tongues and extended in the mating direction of the axial bearing part.

13. The flange-bearing shell in accordance with claim 1, wherein the retaining tongues have a peripheral length projected onto the developed plane of 4 to 15 mm.

14. The flange-bearing shell in accordance with claim 1, wherein the tab of the radial bearing part axially adjacent to the open-edged retaining recess extends in the peripheral direction 0.8 to 1.5 mm, and has an axial thickness of 0.7 to 1.2 mm.

15. The flange-bearing shell in accordance with claim 14 wherein the tab extends in the peripheral direction 0.9 to 1.2 mm.

16. The flange-bearing shell in accordance with claim 1, wherein a notch is provided in the transition between the tab axially adjacent to the open-edged retaining recess and the surface axially adjacent to the retaining recess in the peripheral direction towards the vertex, the notch identifying a predetermined bending point for the tab.

17. The flange-bearing shell in accordance with claim 16, wherein the notch describes a segment radius between 0.3 and 0.5 mm.

18. The flange-bearing shell in accordance with claim 1, wherein the retaining recess viewed in projection onto the view of the radial bearing part prior to the bending of the tab are configured essentially as a rectangle.

19. The flange-bearing shell in accordance claim 1, wherein only the two retaining tabs and corresponding recesses are provided on both sides of the vertex.

* * * * *